US006763416B1

(12) United States Patent
LaBerge

(10) Patent No.: US 6,763,416 B1
(45) Date of Patent: Jul. 13, 2004

(54) CAPTURING READ DATA

(75) Inventor: Paul A. LaBerge, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/363,605

(22) Filed: Jul. 29, 1999

(51) Int. Cl.$^7$ .............................................. G06F 13/14
(52) U.S. Cl. ........................ 710/305; 710/306; 710/310
(58) Field of Search ................................. 710/305, 306, 710/310, 311, 313, 314, 315, 316

(56) References Cited

U.S. PATENT DOCUMENTS

| | | | | |
|---|---|---|---|---|
| 5,623,635 A | * | 4/1997 | Chen et al. .................. | 711/152 |
| 5,734,849 A | * | 3/1998 | Butcher ....................... | 395/308 |
| 5,754,590 A | * | 5/1998 | Bays et al. .................. | 375/222 |
| 5,768,548 A | * | 6/1998 | Young et al. ................ | 710/306 |
| 5,948,083 A | * | 9/1999 | Gervasi ........................ | 710/62 |
| 6,199,131 B1 | * | 3/2001 | Melo et al. .................. | 710/107 |
| 6,212,590 B1 | * | 4/2001 | Melo et al. .................. | 710/119 |
| 6,286,083 B1 | * | 9/2001 | Chin et al. ................... | 711/151 |
| 6,321,315 B1 | * | 11/2001 | LaBerge ...................... | 711/167 |
| 6,330,636 B1 | * | 12/2001 | Bondurant et al. .......... | 711/105 |
| 6,505,305 B1 | * | 1/2003 | Olarig ............................ | 714/5 |

* cited by examiner

Primary Examiner—Sumati Lefkowitz
Assistant Examiner—X. Chung-Trans
(74) Attorney, Agent, or Firm—Trop, Pruner & Hu, P.C.

(57) ABSTRACT

A bridge for use with a local bus and a memory bus capable of indicating data includes conductive traces and a local bus interface. The conductive traces are adapted to communicate indications of the data from a first region near the memory bus to a second region near the local bus. The local bus interface is located closer to the local bus than to the memory bus, and the local bus interface includes a buffer that is adapted to capture the indications of the data from the conductive traces near the second region to directly capture the data from the memory bus.

24 Claims, 5 Drawing Sheets

CAPTURING READ DATA

BACKGROUND

The invention relates to capturing read data.

Referring to FIG. 1, a typical computer system may include at least one bridge 10 to establish communication between different buses of the computer system 10. For example, the bridge 10 may include a memory interface 14 and a local bus interface 18 for purposes of establishing communication between memory devices that are coupled to a memory bus 12 and a bus agent that is coupled to a local bus 20. In this manner, a processor 21 (a central processing unit (CPU), for example) may furnish signals to the local bus 20 for purposes of initiating a request (called a memory read request) to retrieve data from a system memory 11. The local bus interface 18 detects the request by decoding the signals from the local bus 20 and communicates an indication of the request to the memory interface 14. The memory interface 14, in turn, furnishes signals to the memory bus 12 to initiate a memory read operation with the memory 11. In this manner, in the course of the memory read operation, the memory 11 furnishes signals (to the memory bus 12) that indicate the requested data, and the memory interface 14 captures the data into a buffer 15 of the memory interface 14. The bridge 10 subsequently transfers the captured data (via a multiplexing circuit 16) from the buffer 15 to a buffer 19 in the local bus interface 18. Subsequently, the local bus interface 10 may generate signals on the local bus 20 that indicate the processor's requested data.

As an example, exemplary signals on the memory bus 12 for a memory burst read operation are depicted in FIGS. 2, 3, 4, and 5 for the scenario where the memory 11 is formed from double data rate (DDR) synchronous dynamic random access (SDRAM) memory devices. In particular, the memory interface 14 initiates the burst read operation by furnishing signals (to the memory bus 12) that indicate a read command, as depicted in FIG. 3. At time $T_0$ on the positive edge of a memory bus clock signal (called CK (see FIG. 2)), a memory device (a memory module or memory chip, as examples) of the memory 11 latches the signals that indicate the read command, and the memory device begins responding to the burst read operation. In this manner, the memory device begins furnishing a data strobe signal called DQS (see FIG. 4) to a data strobe line of the memory bus 12 at time $T_1$ by driving the DQS signal from a tri-stated level to a logic zero level.

From time $T_2$ to time $T_6$, the DQS signal (until the control of the memory device) follows the CK signal, and during this time interval, the memory device furnishes a different set of data (a sixty-four bit set of data, for example) to the data lines of the memory bus 12 on each positive and negative edge (i.e., on each strobe edge) of the DQS signal. For example, at time $T_2$ beginning on the positive edge of the DQS signal, the memory device may furnish sixty-four bits of data (for a sixty-four bit data path, for example), and beginning at time $T_3$, the memory devices may furnish another sixty-four bits of data. As an example, a data signal (called DQ) from a data bit line of the memory bus 12 is depicted in FIG. 5. The DQ signal indicates a bit of data during a data eye. Thus, for example, the data eye for a bit Do occurs between times $T_2$ and $T_3$. Internally, the memory interface 14 may shift the DQS signal so that the strobe edges of the DQS signal are aligned in the center of the corresponding data eyes. Due to this arrangement, the edges may be used by the memory interface 14 to trigger the capture of data from the memory bus 12. At time $T_6$, the memory device stops driving the data strobe line, and the DQS signal returns to the tri-stated level.

The bridge 10 may retrieve the data from the buffer 15 using either an internal clock domain that typically has a higher frequency (double the frequency, for example) than the clock domain of the memory bus 12 or by alternatively using a larger internal datapath. As a result, the memory interface 14 may wait for several internal clock cycles to ensure that the data in the buffer 15 is valid before retrieving the data from the buffer 15. Once the data is retrieved, the bridge 10 routes the data to the local bus interface 18 via a data path 17 (depicted in FIG. 1) that extends from the memory interface 14, through the multiplexing circuit 16 and then to the buffer 19 in the local bus interface 18. Unfortunately, the data path 17 may introduce a significant asynchronous propagation delay, and the buffer 19 may not latch valid data until several internal clock cycles (two, for example) have elapsed after the data leaves the buffer 15. The additional internal clock cycles that are needed to transfer the data between the buffers 15 and 19 may extend the time needed to satisfy the read request.

Thus, there is a continuing need for a bridge that responds in a more timely fashion to a memory read request.

SUMMARY

In one embodiment of the invention, a bridge for use with a local bus and a memory bus capable of indicating data includes conductive traces and a local bus interface. The conductive traces are adapted to communicate indications of the data from a first region near the memory bus to a second region near the local bus. The local bus interface is located closer to the local bus than to the memory bus, and the local bus interface includes a buffer that is adapted to use the indications of the data from the conductive traces near the second region to directly capture the data from the memory bus.

In another embodiment, a method is usable with a computer system that includes a local bus and a memory bus. The method includes furnishing data to the memory bus in a memory read operation and capturing the data directly from the memory bus in a buffer that is located closer to the local bus than to the memory bus.

In another embodiment, a method is usable with a computer system. The method includes substantially extending a memory bus into a bridge. The memory bus is adapted, to indicate data in a memory read operation, and the data is captured directly from the extension of the memory bus into the bridge.

Advantages and other features of the invention will become apparent from the following description, from the drawing and from the claims.

DETAILED DESCRIPTION

Figure 1:
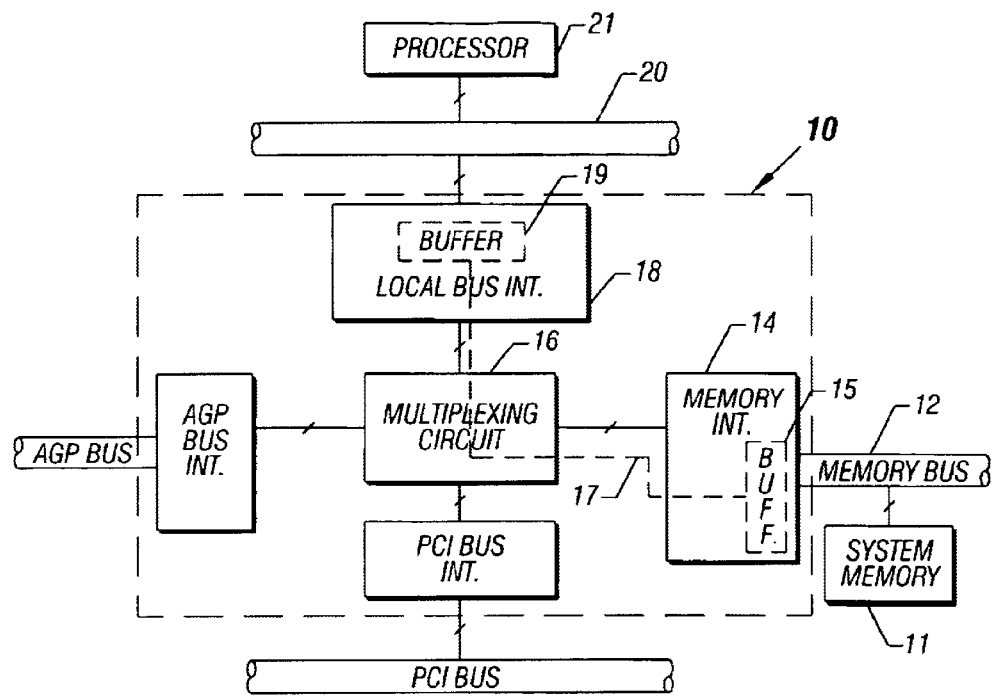
FIG. 1 is a schematic of a bridge circuit of the prior art.
Figure 2:
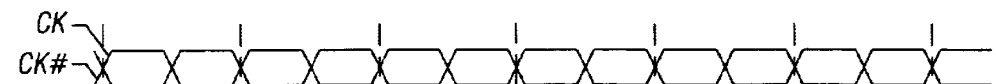
FIGS. 2, 3, 4 and 5 illustrates waveforms of memory bus signals of the prior art.
Figure 3:
Figure 4:
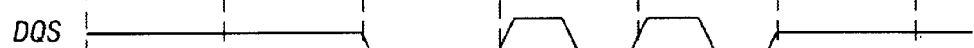
Figure 5:
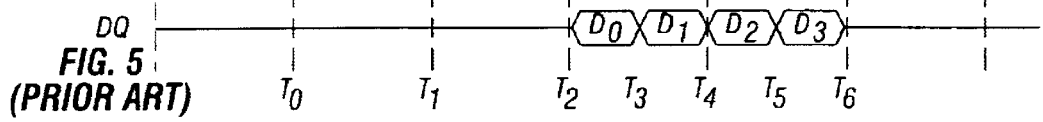
Figure 6:
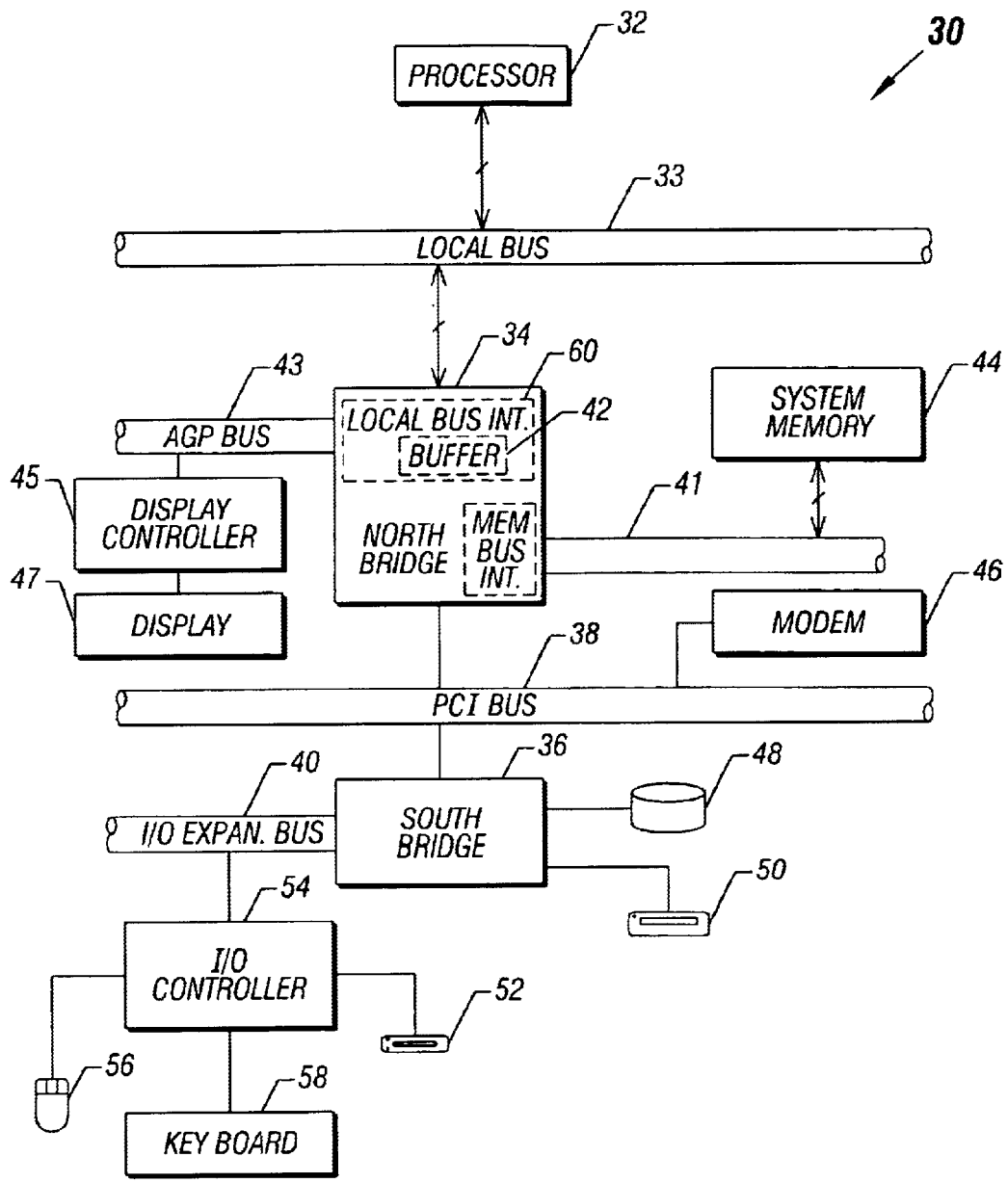
FIG. 6 is a schematic diagram of a computer system according to an embodiment of the invention.

Referring to FIG. 6, an embodiment 30 of a computer system in accordance with the invention includes a north bridge 34 that is adapted to minimize read latency that is introduced by the north bridge 34. In particular, a local bus interface 60 of the bridge 34 includes a buffer 42 that is adapted to capture read data directly from a memory bus 41. Thus, the read data is captured near a local bus 33 (and not near the memory bus 41), an arrangement that may reduce the number of internal clock cycles (of the bridge 34) that elapse in the transfer of data from the memory bus 41 to the buffer 42.

For example, a processor 32 (a central processing unit (CPU), as an example) may furnish signals to the local bus 33 to indicate a memory read operation. In response to the signals on the local bus 33, the bridge 34 may generate signals on the memory bus 41 to initiate a read operation with a system memory 44. In this manner, in the course of the memory read operation, the system memory 44 furnishes signals (to the memory bus 41) that indicate the requested read data. Unlike conventional bridges, the bridge 34 bypasses a memory bus interface 64 (of the bridge 34) and captures the read data directly into the buffer 42 of the local bus interface 60.

Figure 7:
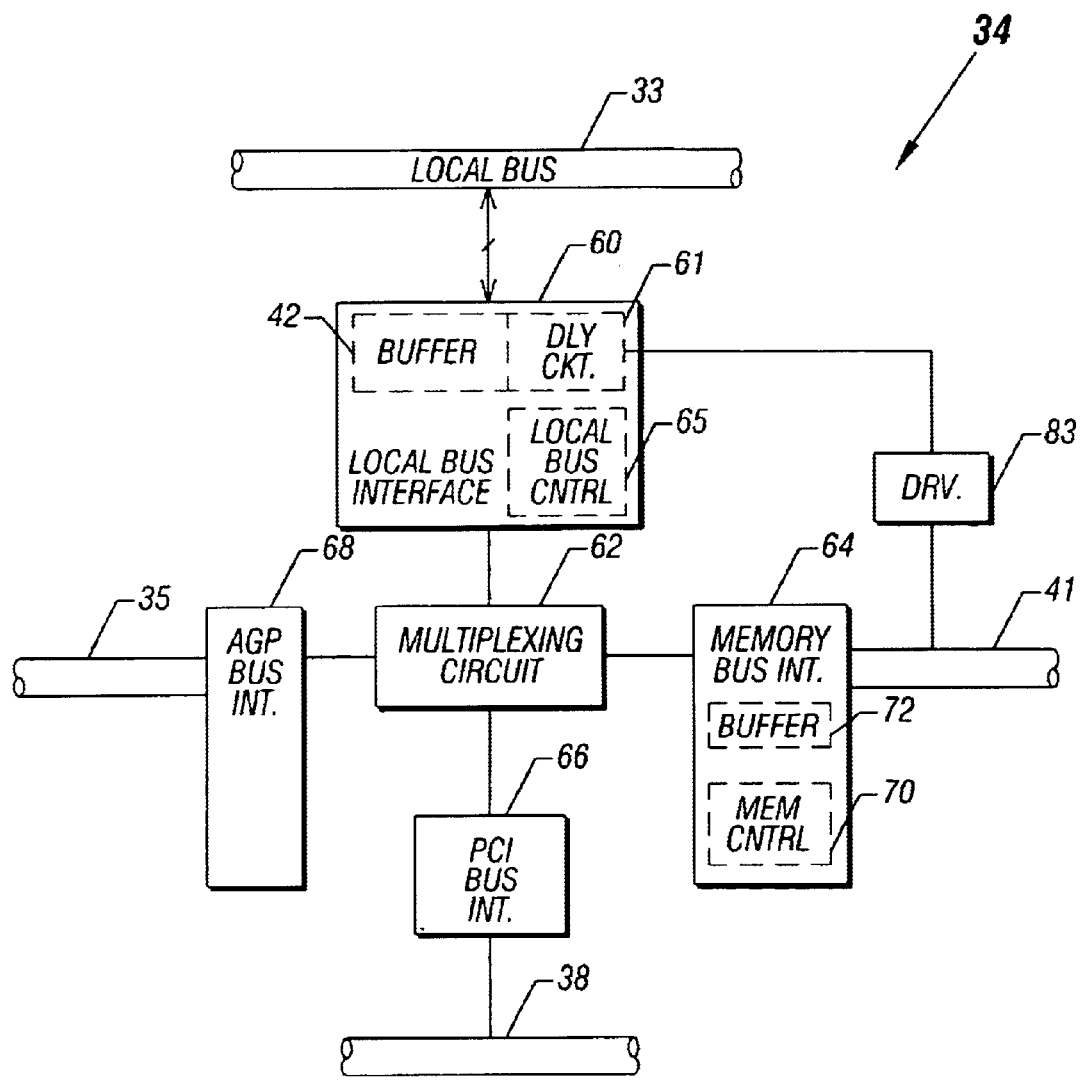
FIG. 7 is a schematic diagram of a bridge of the computer system of FIG. 6 according to an embodiment of the invention.

Referring to FIG. 7, more particularly, unlike conventional arrangements, the bridge 34 effectively extends the memory channel provided by the memory bus 41 inside the bridge 34. In this manner, the data and strobe lines of the memory bus 41 (via internal data and data strobe conductive traces, or lines 80) are effectively extended by placing the buffer 42 closer to the local bus 33 than to the memory bus 41. As a result of this arrangement, a much smaller asynchronous propagation delay is incurred in the transfer of data from the buffer 42 to the local bus 33, as compared to the asynchronous delay encountered in a conventional bridge in which the data is transferred from a memory bus interface (where the data is captured) to a local bus interface.

Thus, the transfer of read data through a conventional bridge circuit includes two latching events to compensate for asynchronous propagation delays: one latching event to capture the read data into a memory bus interface (that is located near the memory bus) and another latching event to capture the data in a local bus interface (that is located near the local bus) after the data propagates between the memory and local bus interfaces. Each of these latching events, in turn, consumes internal clock cycles of the conventional bridge, as each latching event must accommodate the worst case delay scenario. However, unlike this conventional arrangement, the bridge 34 compensates for the asynchronous delays that are introduced by the memory bus 41 and the data and data strobe lines 80 in one latching event. Thus, the bridge 34 provides a more efficient arrangement that may permit the data to be communicated across the bridge 34 in a fewer number of internal clock cycles, as compared to conventional bridges.

In some embodiments, the memory 44 may be formed from double data rate (DDR) synchronous dynamic random access memory (SDRAM) devices (double inline memory modules (DIMMs), for example), and the memory bus 41 may be a DDR memory bus. For these embodiments, the DQS data strobe signals from the memory bus 41 may be used to synchronize the capture of the data from the bus 41, as described below. For these embodiments, the local bus interface 60 may include a delay circuit 61 to align the edges of the DQS signals with the "data eyes" of the signals that indicate the data for purposes of capturing valid data from the memory bus 41. The delay circuit 61 may be initially programmed by execution of a basic input/output system (BIOS) during bootup of the computer system 30, and thereafter, the delay circuit 61 may regulate the introduced delay(s) to compensate for changing voltages and temperatures, factors that may affect the delay(s).

Among the other features of the bridge 34, the memory bus interface 64 may include a write buffer 72 for furnishing memory write data to the memory bus 41. The memory bus interface 64 may also include a memory controller 70 that furnishes signals (clock signals and control signals, as examples) to the memory bus 41 to perform selected memory bus operations (read, write and refresh operations, as examples) with the system memory 44. The local bus interface 60 may include a local bus controller 65 that, among other things, furnishes signals to encode and decode bus cycles on the local bus 33. A driver 83 of the bridge 34 may be coupled to the data and data strobe lines of the memory bus 41 and furnish signals that indicate the voltages of these lines to the end of the lines 80 closest to the memory bus 41.

Other bus interfaces of the bridge 34 may include an Accelerated Graphics Port (AGP) bus interface 68 and a Peripheral Component Interconnect (PCI) bus interface 66. The AGP is described in detail in the Accelerated Graphics Port Interface Specification, Revision 1.0, published on Jul. 31, 1996, by Intel Corporation of Santa Clara, Calif. The PCI Specification is available from the PCI Special Interest Group, Portland, Oreg. 97214.

Figure 8:
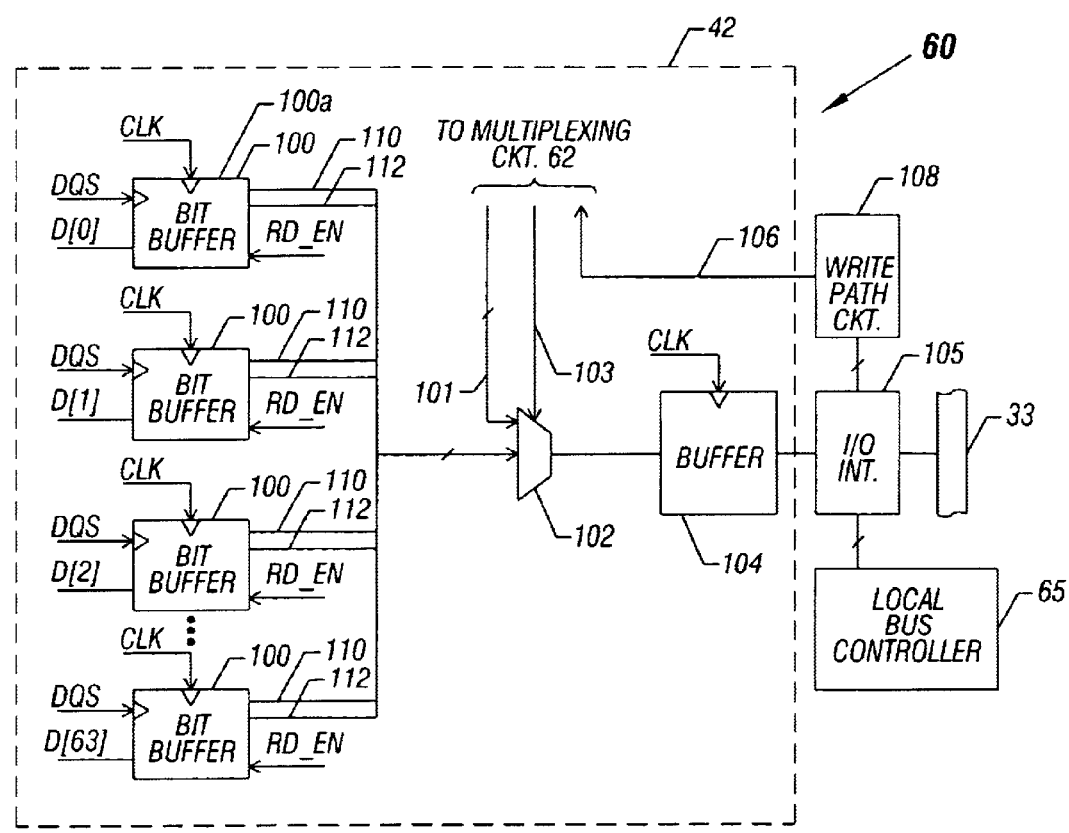
FIG. 8 is a schematic diagram of a buffer of a local bus interface of the bridge of FIG. 7 according to an embodiment of the invention.

Referring to FIG. 8, in some embodiments, the memory bus 41 may include sixty-four data lines that may be used to communicate sixty-four bits of data (i.e., one double Dword, or Qword) that are represented by the notation D[63:0], and the buffer 42 may include a bit buffer 100 for each data line of the memory bus 41. In some embodiments, each bit buffer 100 may store up to eight bits of data from eight respective Qwords that appear on the memory bus 41. Thus, collectively, in some embodiments, the sixty-four bit buffers 100 may store up to two cache lines (i.e., 64 bytes) of data. Two Qwords may be simultaneously retrieved from the bit buffers 100: an upper address Qword that is furnished by upper bit lines 110 (one upper bit line 110 per bit buffer 100) and a lower address Qword that is furnished by lower bits lines 112 (one lower bit line 112 per bit buffer 100).

Each bit buffer 100 latches its respective data bits on the positive and negative edges of a DQS data strobe signal. Different bit buffers 100 may receive different DQS signals from the lines 80. In this manner, the lines 80 are arranged so that each DQS signal experiences approximately the same delay as an associated group of the data signals. Thus, a particular DQS signal may be used to latch the bit buffers 100 that receive the data signals that are associated with the DQS signal.

The bit buffers 100 begin furnishing the latched bits to the bit lines 110 and 112 in synchronization with an internal clock signal (called CLK) when a read enable signal (called RD_EN) is asserted. Because the bit buffers 100 may store several entries (eight, for example) and the CLK signal may have a higher frequency (double the frequency, for example) than the frequency of the DQS strobe (when active), a sufficient number of cycles of the CLK signal may be permitted to elapse before the latched data is retrieved from the buffers 100 in order to ensure that the latched data is valid.

The upper 110 and lower 112 bit lines may be coupled to input terminals of a multi-bit multiplexer 102. Other input terminals 101 of the multiplexer 102 may be coupled to the multiplexing circuitry 62 for purposes of receiving data captured by the AGP 68 or PCI 66 bus interfaces. The selection of the data from either the bit buffers 100, the AGP interface 68, or the PCI bus interface 66 may be controlled by, for example, selection lines 103 that are coupled to the multiplexing circuitry 62. In some embodiments, the output terminals of the multiplexer 102 are coupled to a buffer 104 that stores data to be furnished to the local bus 33.

The local bus interface 60 may also include the local bus controller 65, an input/output (I/O) interface 105 for driving and buffering signals to/from the local bus 33 and write path circuitry 108.

Figure 9:
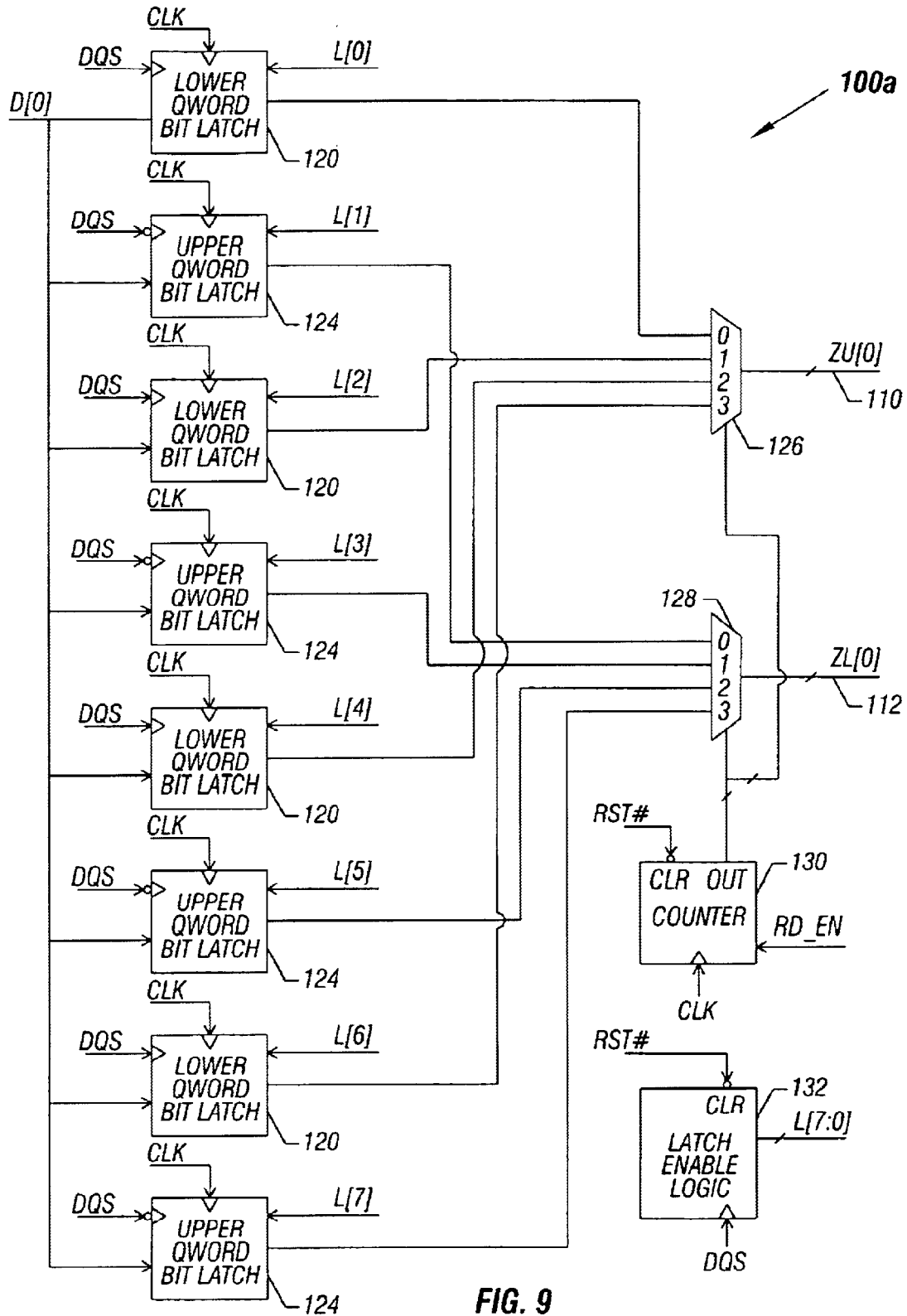
FIG. 9 is a schematic diagram of a bit buffer of the buffer of FIG. 8 according to an embodiment of the invention.

Referring to FIG. 9, as an example, in some embodiments, the bit buffer 100a that receives the D[0] bit may have the following design that is similar to the design of the other bit a buffers 100. In particular, in some embodiments, the bit buffer 100a may include lower Qword bit latches 120 that store the lowest order bits D[0] for the lower Qwords and upper Qword bit latches 124 that store the lowest order bits D[0] for the upper Qwords. The lower Qword bit latches 120 capture the D[0] bit on positive edges of the DQS signal when their respective latch enable signal (L[0], L[2], L[4] or L[6]) is asserted, and the upper Qword bit latches 124 capture the D[0] bit on negative edges of the DQS signal when their respective latch enable signal (L[1], [3], L[5] or L[7]) is asserted. Each latch enable signal is asserted for a different edge of the DQS signal, and thus the different latches 120, 124 store bits for Qwords from eight different memory locations.

The bit latch 100a may include a multi-bit multiplexer 126 that is coupled to the output terminals of the upper Qword bit latches 120 and a multi-bit multiplexer 128 that is coupled to the output terminals of the lower Qword bit latches 124. The multiplexer 126 provides the upper bit line 110 of the bit latch 100a, and the multiplexer 128 provides the lower bit line 112 of the bit latch 100a. The select terminals of both multiplexers 126 and 128 receive the same signals from a counter 130 that is clocked by the CLK signal. When the counter 130 is enabled (by the assertion of the RD_EN read enable signal), the counter 130 controls the multiplexers 126 and 128 so that the D[0] bits for the upper and lower Qword pair are provided at the same time. The bit latch 100a may include latch enable logic 132 that furnishes the latch enable signals. The latch enable logic 132 is clocked by the DQS signal.

Referring back to FIG. 6, beside the components described above, the computer system 30 may also include a display controller 45 that is coupled to the AGP bus 43 and controls a display 47. A modem 46, for example, may be coupled to the PCI bus 38 along with a south bridge 36. The south bridge 36 may provide an interface to an I/O expansion bus 40, a hard disk drive 48 and a CD-ROM 50. An I/O controller 54 may be coupled to the I/O expansion bus 40 and receive input from a mouse 56 and a keyboard 58. The I/O controller 54 may further control the operation of a floppy disk drive 52.

In this context of this application, the term "processor" may generally refer to at least one central processing unit (CPU), microcontroller or microprocessor, as just a few examples. The phrase "computer system" may refer to any type of processor-based system, such as a desktop computer or a laptop computer, as just a few examples. Thus, the invention is not intended to be limited to the illustrated computer system 30, but rather, the computer system is an example of one of many possible embodiments.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A computer system comprising:
   a local bus;
   a memory bus capable of indicating data;
   a first buffer adapted to capture the data directly from the memory bus, the buffer being located closer to the local bus than to the memory bus; and
   a memory interface located closer to the memory bus than to the local bus, the memory interface including a second buffer to store other data to be furnished to the memory bus.

2. The computer system of claim 1, wherein
   the memory bus is capable of indicating a data strobe signal, and
   the first buffer is adapted to latch the data from the memory bus in response to the data strobe signal.

3. The computer system of claim 1, further comprising:
   conductive traces adapted to communicate indications of the data from a first region located closer to the memory bus than to the first buffer to a second region located closer to the first buffer than to the memory bus, the conductive traces introducing an approximate first asynchronous propagation delay in the communication.

4. The computer system of claim 3, further comprising:
   circuitry adapted to transfer the data from the first buffer to the local bus without introducing a second propagation asynchronous propagation delay that is greater than the first asynchronous propagation delay.

5. The computer system of claim 1, wherein the first buffer is part of a local bus interface.

6. The computer system of claim 1, further comprising:
   circuitry adapted to transfer the data from the first buffer to the local bus, at least a portion of the circuitry being synchronized to a clock signal and the circuitry adapted to transfer the data without introducing an asynchronous propagation delay greater than approximately one cycle of the clack signal.

7. The computer system of claim 1, wherein the first buffer is part of a local bus interface that is coupled to the local bus, the computer system further comprising:
   a third bus;
   a fourth bus;
   a third bus interface coupled to communicate with the third bus;
   a fourth bus interface coupled to communicate with the fourth bus; and
   a multiplexing circuit adapted to selectively cause the first buffer to store other data from the third and fourth bus interfaces.

8. The computer system of claim 1, wherein the first buffer is part of a local bus interface that is located closer to the local bus than to the memory bus.

9. The computer system of claim 8, wherein the local bus interface further comprises:
   a local bus controller adapted to use the first buffer to furnish signals to the local bus that indicate the data.

10. A bridge for use with a local bus and a memory bus capable of indicating data, comprising:

conductive traces adapted to communicate indications of the data from a first region closer to the memory bus than the local bus to a second region located closer to the local bus than to the memory bus;

a local bus interface being located closer to the local bus than to the memory bus, the local bus interface including a first buffer adapted to capture the indications of the data from the conductive traces near the second region to directly capture the data from the memory bus; and a memory interface located spatially closer to the memory bus than to the local bus, the memory interface including a second buffer to store other data to be furnished to the memory bus.

11. The bridge of claim 10, wherein the memory bus is capable of indicating a data strobe signal, and the first buffer is adapted to latch the data in response to the data strobe signal.

12. The bridge of claim 10, further comprising:

a third bus;

a fourth bus;

a third bus interface coupled to communicate with the third bus;

a fourth bus interface coupled to communicate with the fourth bus; and a multiplexing circuit adapted to selectively pause the first buffer to store other data from the third and fourth bus interfaces.

13. The bridge of claim 10, wherein the heal bus interface further comprises:

a local bus controller adapted to use the first buffer to furnish signals to the local bus that indicate the data.

14. The bridge of claim 10, wherein the conductive traces introduce a first asynchronous propagation delay to the indications of the data, the bridge further comprising:

circuitry adapted to transfer the data from the first buffer to the local bus without introducing a second asynchronous propagation delay that is greater than the first asynchronous propagation delay.

15. The bridge of claim 14, further comprising:

circuitry adapted to transfer the data from the first bus to the local bus, at least a portion of the circuitry being synchronized to a clock signal and the circuitry adapted to transfer the data without introducing an asynchronous propagation delay greater than approximately one cycle of the clock signal.

16. A method usable with a computer system that includes a local bus and a memory bus, the method comprising:

furnishing data to the memory bus in a memory read operation;

capturing the data directly from the memory bus in a first buffer that is located closer to the local bus than to the memory bus; and furnishing other data to the memory bus from a second buffer that is located in a memory interface, the memory interface being located closer to the memory bus than to the local bus.

17. The method of claim 16, wherein the act of capturing comprises:

latching the data from the memory bus in response to a data strobe signal of the memory bus.

18. The method of claim 16, further comprising:

using conductive traces adapted to communicate indications of the data from a first region located closer to the memory bus than to the first buffer to a second region located closer to the first buffer than to the memory bus, the conductive lines introducing an approximate first asynchronous propagation delay in the communication.

19. The method of claim 18, further comprising: transferring the data from the first buffer to the local bus without introducing a second asynchronous propagation delay that is greater than the first asynchronous propagation delay.

20. The method of claim 16, further comprising: transferring the data from the first buffer to the local bus; and synchronizing the transferring to a clock signal, wherein the transferring occurs without introducing an asynchronous propagation delay greater than approximately one cycle of the clock signal.

21. A method usable with a computer system, comprising:

extending a memory bus into a bridge, the memory bus being adapted to indicate data in a memory read operation;

capturing the data directly from the extension of the memory bus into a first buffer of the bridge, the first buffer being located closer to a local bus than to the memory bus; and furnishing other data to the memory bus from a second buffer located inside a memory interface, the memory interface being located closer to the memory bus than to the local bus.

22. The method of claim 21, wherein the act of capturing comprises:

latching the data from the extension of the memory bus in response to a data strobe signal of the memory bus.

23. The method of claim 21, wherein the act of extending comprises:

extending the memory bus into the bridge so that the extended end of the memory bus is closer to the local bus than to the portion of the memory bus that is located outside of the bridge.

24. The method of claim 21, further comprising: transferring the data from the second buffer to the local bus; and, synchronizing the transferring to a clock signal, wherein the transferring occurs without introducing an asynchronous propagation delay greater than approximately one cycle of the clock signal.

* * * * *